United States Patent [19]
Nakajima

[11] Patent Number: 5,485,278
[45] Date of Patent: Jan. 16, 1996

[54] CHARACTER PROCESSING METHOD AND APPARATUS WITH BRIGHTNESS CORRECTION BASED OUTPUT SIZE

[75] Inventor: Nobuyuki Nakajima, Kawasaki, Japan

[73] Assignee: Canon Kabushiki Kaisha, Tokyo, Japan

[21] Appl. No.: 347,184

[22] Filed: Nov. 22, 1994

Related U.S. Application Data

[63] Continuation of Ser. No. 97,914, Jul. 28, 1993, abandoned, which is a continuation of Ser. No. 749,887, Aug. 26, 1991, abandoned.

[30] Foreign Application Priority Data

Aug. 29, 1990 [JP] Japan ..................................... 2-225378

[51] Int. Cl.⁶ .............................. H04N 1/23; H04N 1/46; G06F 15/00; G09G 5/00
[52] U.S. Cl. .......................... 358/296; 358/528; 395/102; 395/110; 345/22; 345/127
[58] Field of Search ...................... 358/296, 451, 358/518, 523, 528; 395/102, 110, 131, 132, 150, 151; 345/20, 22, 24, 127, 153; 382/41, 47, 276, 298

[56] References Cited

U.S. PATENT DOCUMENTS

| | | | |
|---|---|---|---|
| 3,976,991 | 8/1976 | Hickin et al. | 340/324 A |
| 4,581,610 | 4/1986 | Nagazumi | 340/723 |
| 4,701,806 | 10/1987 | Nagashima | 358/451 |
| 4,803,464 | 2/1989 | Holmes et al. | 340/701 X |
| 4,907,282 | 3/1990 | Daly et al. | 340/731 X |
| 4,958,301 | 9/1990 | Kobayashi | 340/703 X |
| 4,969,051 | 11/1990 | Sasaki | 358/464 X |
| 4,992,780 | 2/1991 | Pema et al. | 395/131 X |
| 5,028,991 | 7/1991 | Sekizawa et al. | 358/77 X |
| 5,067,098 | 11/1991 | Moellering et al. | 395/131 X |
| 5,270,821 | 12/1993 | Samuels | 345/156 X |
| 5,309,259 | 5/1994 | Taki et al. | 358/528 |

FOREIGN PATENT DOCUMENTS 2116009 9/1983 United Kingdom ............ G06F 3/153

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image processing method and apparatus are used for generating image data including characters or symbols in a color on the basis of a designated size. The brightness at which the image data is generated is changed in accordance with the designated size of a character or symbol. Thus, when printing a character or symbol on a printer, the difference in visual impression which is felt when the character or symbol has been printed in a different size, is reduced.

24 Claims, 7 Drawing Sheets

FIG. 5

| R-VALUE | G-VALUE | B-VALUE |
|---------|---------|---------|
| $V_R$ | $V_G$ | $V_B$ |

FIG. 6

| | |
|---|---|
| POSITION IN PAGE X | 51 |
| POSITION IN PAGE Y | 52 |
| POINT NO. | 53 |
| COLOR DATA POINTER | 54 |
| CODE | 55 |
| ⋮ | |
| POINTER TO NEXT CHR | 56 |

| H-VALUE | S-VALUE | B-VALUE |
|---------|---------|---------|
| $V_H$   | $V_S$   | $V_B$   |

5,485,278

CHARACTER PROCESSING METHOD AND APPARATUS WITH BRIGHTNESS CORRECTION BASED OUTPUT SIZE

This application is a continuation of application Ser. No. 08/097,914 filed Jul. 28, 1993, which was a continuation of application Ser. No. 07/749,887, filed Aug. 26, 1991, both now abandoned.

BACKGROUND OF THE INVENTION

1. Field of the Invention

The present invention relates to an image processing method and apparatus and, more particularity, to an image processing method and apparatus for use in generating image data including characters or symbols in a color.

2. Related Background Art

Hitherto, in a case where character data of different sizes is generated in the same color when a change in size of a character which is to be generated in the color is instructed by a command or the like from a host computer or the like, the color data for that character is not changed.

Therefore, in spite of the fact that the character data is generated using color data designated at a character size different from the designated size, the character data is printed at the same brightness.

However, in the above conventional example, a character of a given character size (characterized e.g., by a particular height and width), for instance, a character of 100-point size and a character of 1-point size are printed at the same brightness irrespective of the size. Therefore, when the results of the prints output to a paper are observed, there occurs a problem that an impression differs depending on the character size in such a manner that a character of a large size appears relatively dark, while a character of a small size appears brighter.

SUMMARY OF THE INVENTION

It is an object of the invention to solve the above conventional drawbacks and to provide an image processing method and apparatus which can execute color output without such a difference in visual impression even if the output size changes.

To accomplish the above object, according to the invention, there is provided an image processing apparatus for recording character or symbol data transmitted from a host computer, at a size based on the size designation for the character or symbol, wherein brightness changing means changes a recording brightness in correspondence to the designated size of the character or symbol.

In such a construction, in a case where the same brightness is designated for a character or symbol having different sizes by a host computer or the like, by providing such brightness changing means for changing the brightness in accordance with the size, the difference in visual impression which is felt when the character or symbol has been printed in a different size, is reduced.

BRIEF DESCRIPTION OF THE DRAWINGS

FIG. 5 is a diagram showing an example of color data in the first embodiment;

FIG. 6 is a diagram showing an example of character-in-page data in the embodiment;

DETAILED DESCRIPTION OF THE PREFERRED EMBODIMENTS

An embodiment according to the invention will be described in detail hereinbelow with reference to the drawings. In this embodiment, particularly, a color printer in which an effect of the invention is remarkable will now be described.

Figure 1:
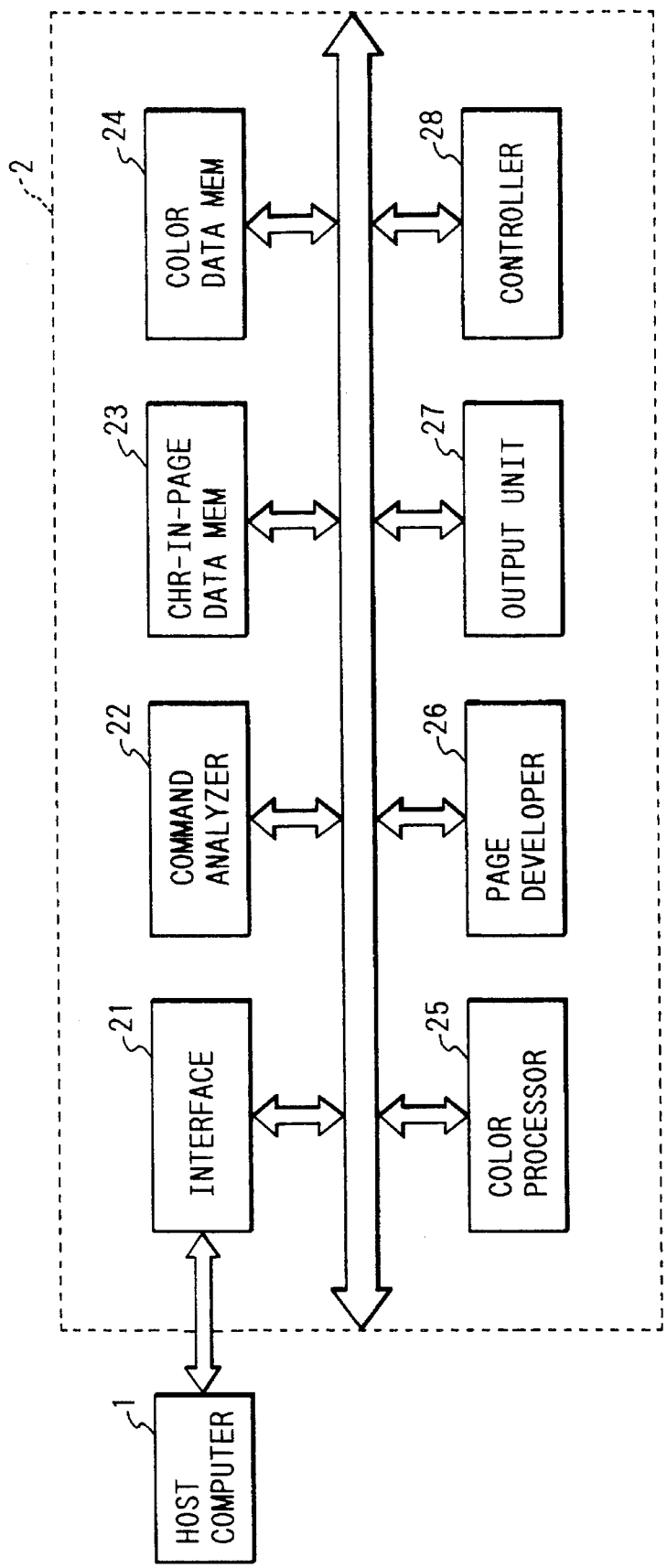
FIG. 1 is a block diagram showing a construction of a color printer according to the first preferred embodiment.

FIG. 1 is a block diagram showing a construction of a color printer according to this embodiment. In the diagram, reference numeral 1 denotes a host computer for making data which is supplied to the printer by the user and for transmitting as command data of a character code and a point number (size) designation, a color designation, and the like for the character. Reference numeral 2 denotes a color printer. The color printer 2 analyzes the command data sent from the host computer 1 and prints accordingly on a print paper.

The color printer is constructed as follows. Reference numeral 21 denotes an interface for inputting the command data from the host computer 1. The command data is analyzed by a command analyzer 22 and is converted into character-in-page data and is stored in a character-in-page data memory 23. Particularly, the data regarding the color of a character is processed by a color processor 25 and is stored in a color data memory 24. A page developer 26 forms output data of the type which is most suitable when an output unit 27 generates the data on the basis of the data in the memories 23 and 24. A controller 28 controls the whole color printer 2.

Figure 2:
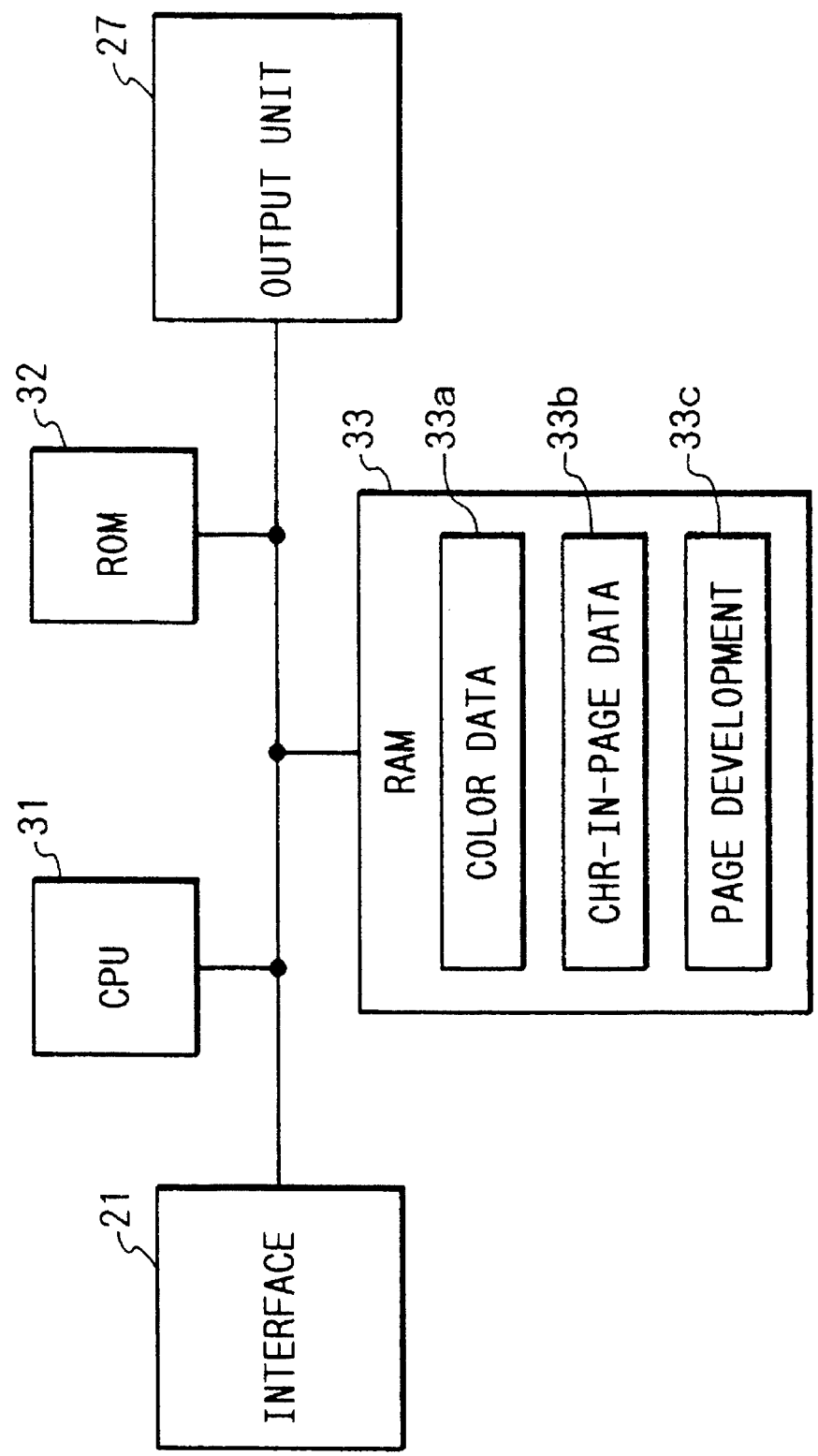
FIG. 2 is a diagram showing a hardware construction of a color printer of the FIG. 1 embodiment.

FIG. 2 is a diagram showing an example of a hardware construction of the color printer of this embodiment.

The interface 21 and the output unit 27 have the same functions as those shown in FIG. 1. Reference numeral 31 denotes a CPU for calculation and control; 32 a ROM to store a control program which is executed by the CPU 31; and 33 a RAM for auxiliary storage having a color data memory 33a, a character-in-page data memory 33b, and a page development memory 33c.

Figure 3:
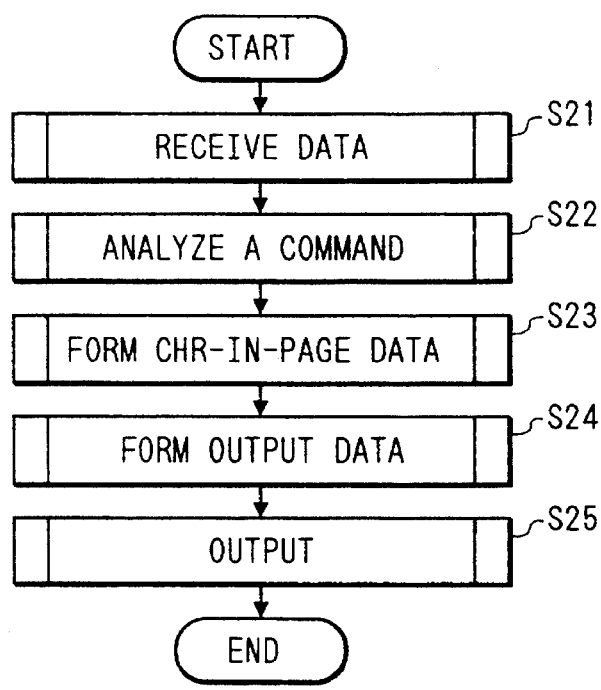
FIG. 3 is a flowchart for a processing procedure of the FIG. 1 embodiment.

A processing procedure of the color printer of this embodiment with the above construction will now be described hereinbelow with reference to a flowchart shown in FIG. 3.

In step S21, command data is received from the host computer 1. The command data is analyzed in step S22. At this time, a color designation command designates the color by a combination of three fundamental colors of R (red), G (green), and B (blue) like a format shown in FIG. 4. A value of each of R, G and B generally indicates the brightness of each color. It is now assumed that such value can be set to a value within a range form 0 to 255.

As the value approaches 0, the brightness is low (dark). As the value approaches 255, the brightness is high (bright). The most average brightness is equal to 127. Generally, a plurality of colors can be expressed by a ratio of the values of R, G, and B.

The color designation command is analyzed in step S22 and is stored in the color data memory 33a as current color data in a format shown in FIG. 5. In the code of the current color data, the R, G and B values in the color designation command format in FIG. 3 are directly reflected to $V_R$, $V_G$ and $V_B$ in FIG. 4. It is assumed hereinafter that an equation to express the R, G and B values as color data is written as follows.

$$[R, G, B] = [R_R, V_G, V_B] \quad \text{①}$$

If the received data indicates the character code as a result of the analysis in step 22, character-in-page data is formed in step S23. The character-in-page data is formed every character as a prestage to form an output page, which will be explained hereinafter, and is constructed by a format as shown in FIG. 6. In FIG. 6, positions-in-page X and Y shown by reference numerals 51 and 52 denote data indicating at which positions in the page which is at present being formed the character is printed. For instance, each of the positions X and Y is set to a value using the number of dots as a unit. Reference numeral 53 denotes the point number of the character. A value of the point number of the character. A value of the point number 53 is designated by a command from the host computer 1. Reference numeral 54 denotes a color data pointer to the color data memory 33a in which the color data the character is stored in the format of FIG. 5.

Figure 7:
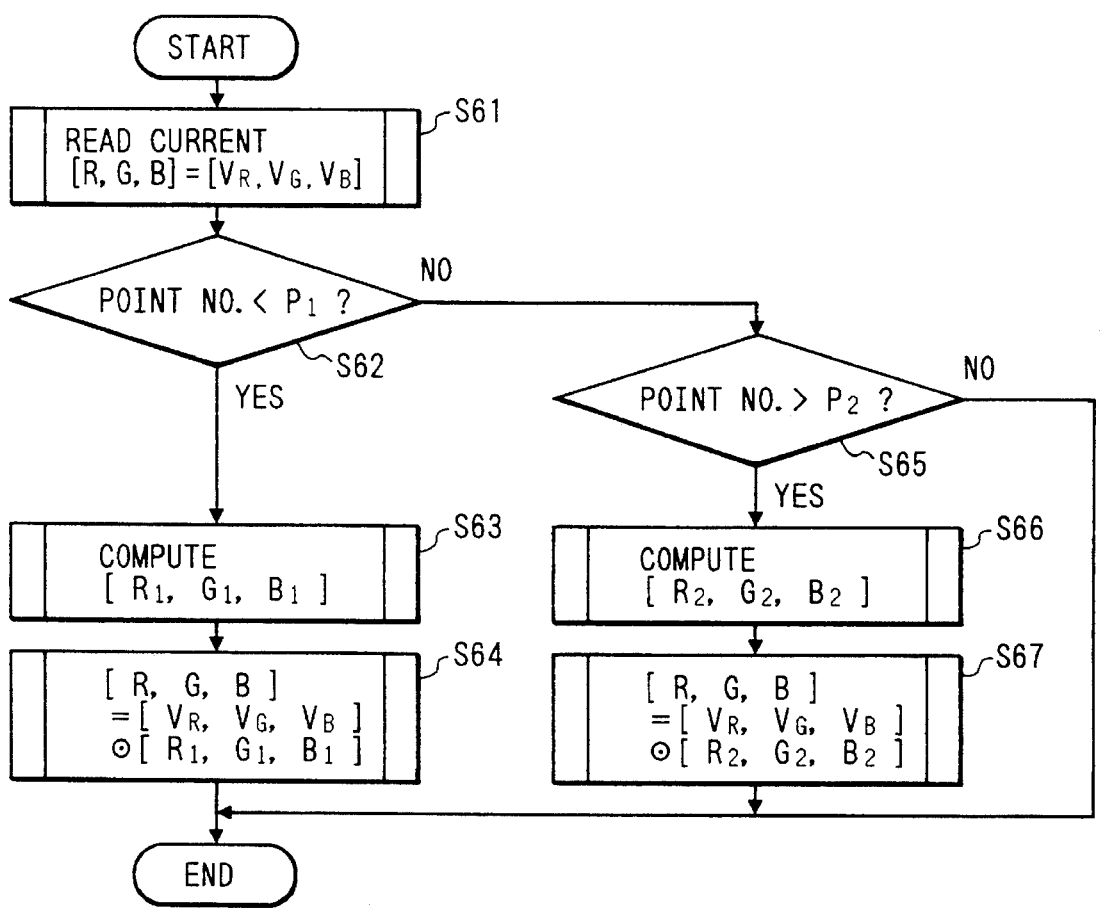
FIG. 7 is a flowchart illustrating formation of character color data in the first embodiment.

The color data is formed in accordance with a flowchart shown in FIG. 7.

That is, the current data $[R, G, B] = [V_R, V_G, V_B]$ in the color data memory 33a is read out in step S61. In step S62, the point number 53 of the character is compared with a predetermined threshold value $P_1$. When the point number 53 is smaller than $P_1$, RGB values $R_1$, $G_1$ and $B_1$ for fine adjustment to reduce the brightness of the color data of the character are calculated in step S63. The RGB values for fine adjustment can be calculated by the color processor 25 on the basis of the point number of the character and the current color data or can be also calculated by using a table for fine adjustment values which has been prepared in the color data memory 33a. In step S64, the color data of the character is determined from the current color data $V_R$, $V_G$ and $V_B$ which have been read in step S61 and the RGB values $R_1$, $G_1$ and $B_1$ for fine adjustment which have been derived in step S63. In step S65, if the point number of the character is larger than a threshold value $P_2$, a process to increase the brightness of the color data of the character is executed on the basis of RGB values $R_2$, $G_2$ and $B_2$ for fine adjustment as shown in steps S66 and S67. The color data is decided by the above procedure and is stored and is pointed to by the color data pointer 54 of the character-in-page data.

A code 55 is subsequently stored as a procedure to form the character-in-page data in step S23. All of the data of the other component elements of the character data is stored. Finally, a pointer 56 to the character-in-page data of the next character is stored. A chain structure of all of the characters in one page is formed. That is, by sequentially tracing the character-in-page data from the head character of the page, the operation reaches the last character of the page.

In step S24, output data of the type which is optimum when the output unit 27 executes the printing process is formed on the basis of the character-in-page data formed in step S23 and the color data. That is, in the case of a page printer having a full-bit map memory to output one page, bit map data of one page is formed by the operations such that the bit map data of one character is first developed on a full-bit map with reference to the character-in-page data of the head character of the page and the processing routine is subsequently shifted to the process of the next character by a next character pointer.

Figure 4:
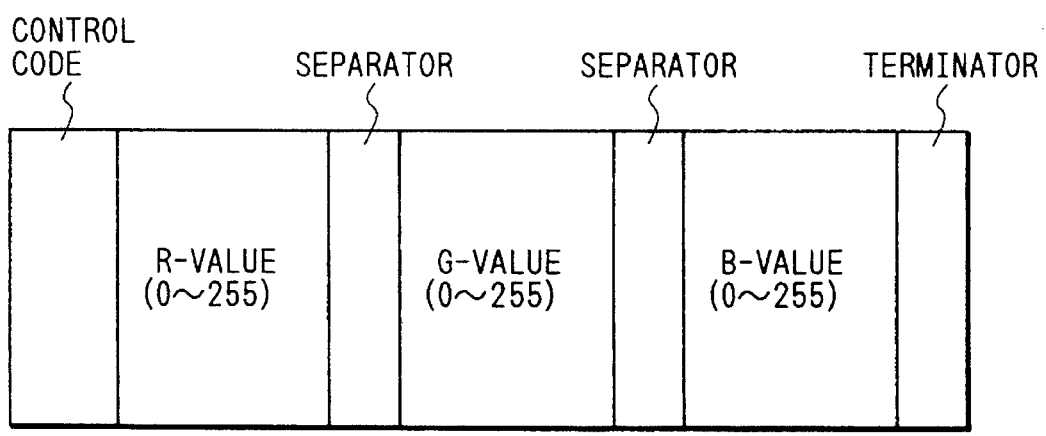
FIG. 4 is a diagram showing an example of a color designation command format in the first embodiment.

At this time, the color data of the format shown in FIG. 4 in the color data memory 33a is converted into the data of, for instance, YMCK (yellow, magenta, cyan, black) by the color processor 25. Therefore, for example, in the case of a color laser beam printer, the output data is developed every color into four bit map memories of Y, M, C and K each having a capacity corresponding to one page. Therefore, in the output of step S25, the data in the bit map memories is transmitted to the output unit 27 every color of Y, M, C and K by a raster scanning method, thereby performing a color print.

In the above embodiment, the color designation of the RGB format as shown in FIG. 4 has been executed by the host computer and the RGB values have been also provided as color data as shown in FIG. 5. However, a similar idea can be also applied to the case where the RGB format is replaced to a format of hue (H), saturation (S) and brightness (B). It is also assumed that an equation to express the HSB values as color data is written as follows.

$$[H, S, B] = [V_B, V_S, V_B] \quad \text{②}$$

Figures 8, 9:
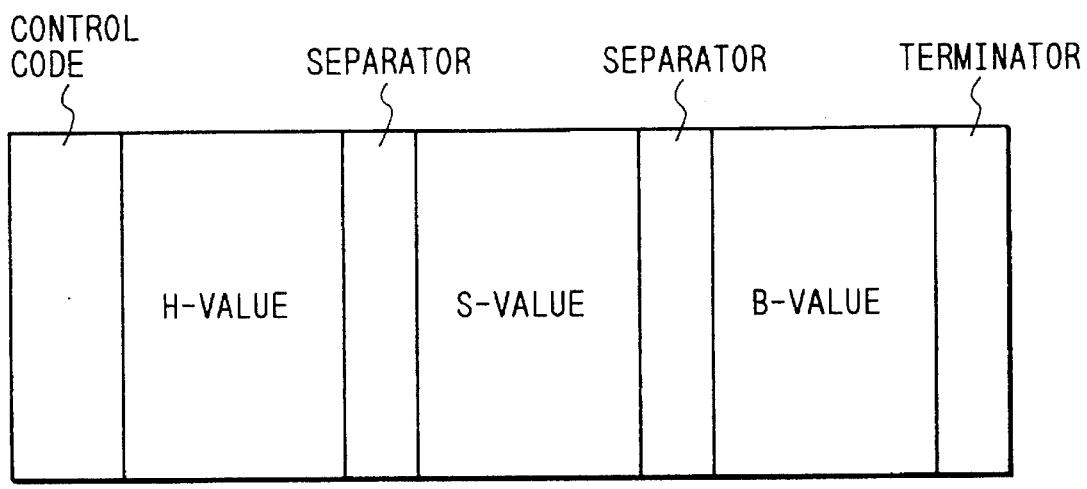
FIG. 8 is a diagram showing an example of a color designation commend format in the second preferred embodiment.
FIG. 9 is a diagram showing an example of color data in the second embodiment.

That is, the color designation is executed by the host computer by a format as shown in FIG. 8. The HSB values are stored into the color data memory 33a as current color data by a format shown in FIG. 9. Further, as a color data printer of FIG. 6 in the case of forming the character-in-page data in step S23 in FIG. 3, a pointer to the color data memory 33a in which the color data of the format of FIG. 9 is stored is used.

Figure 10:
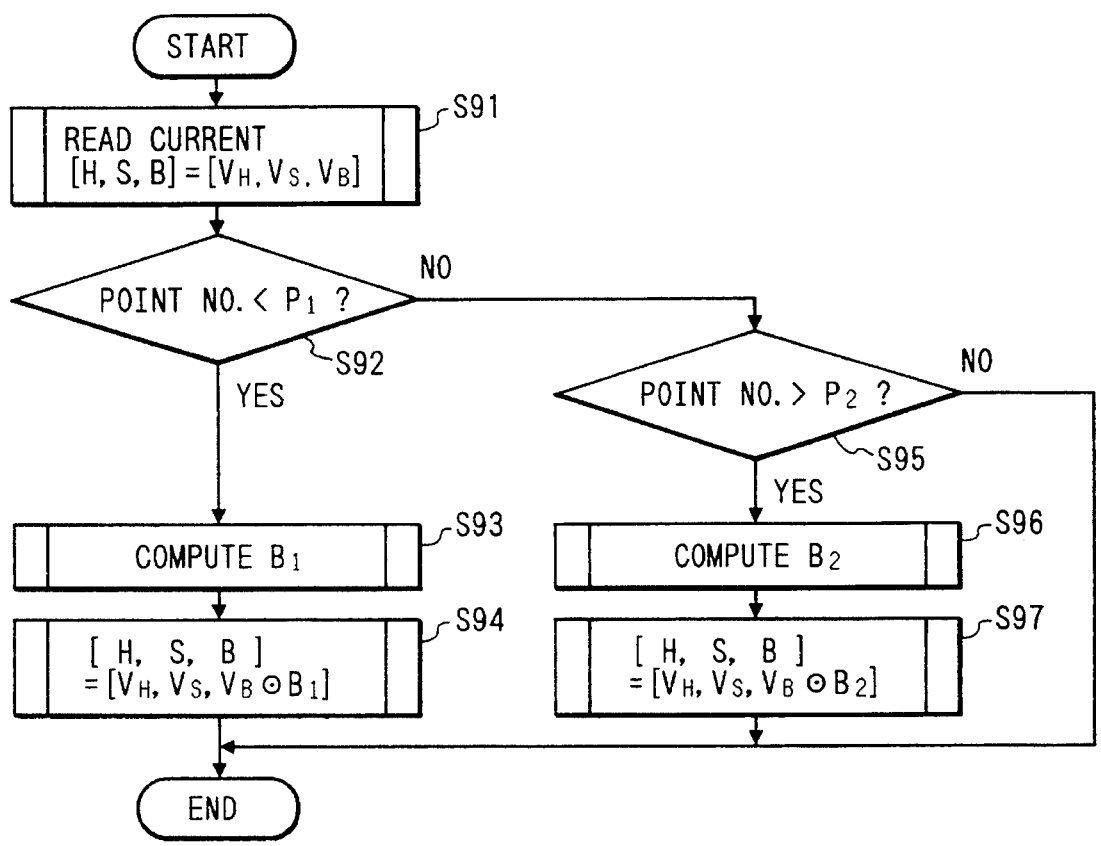
FIG. 10 is a flowchart illustrating formation of character color data in the second embodiment.

The color data is formed by a flowchart shown in FIG. 10.

In step S91, the current color data $[H, S, B] = [V_H, V_S, V_B]$ in the color data memory 33a is first read out. The point number of the character is subsequently compared with the threshold value $P_1$ in step S92. If the point number is smaller than $P_1$, the B value $B_1$ for fine adjustment to reduce the brightness (B) of the color data is calculated in step S93. The B value $B_1$ can be calculated by the color processor 25 on the basis of the point number of the character and the current B value $V_B$ or can be also calculated by using a table prepared in the color data memory 33a. In the next step S94, the color data of the character is determined by executing a certain kind of arithmetic operation on the basis of the brightness $V_B$ of the current color data and $B_1$ calculated in step S93. In steps S95 and S96, the fine adjustments to increase the brightness (B) are executed on the basis of $B_2$.

An output is executed hereinafter by a process similar to that in the foregoing embodiment.

According to the invention, a recording apparatus which does not allow a difference of the visual impression to the felt even if the size is changed can be provided.

That is, by providing the brightness changing means for changing the brightness in accordance with the size in the case where the same brightness has been designated by the host computer or the like for a character or a symbol having a different size, there is an effect such that the visual sense of disorder due to a difference of the size which is felt when the character or symbol has been printed to the paper is reduced.

What is claimed is:

1. An image processing method comprising the steps of:

inputting individual command data for each character of an image, including character color information and character size information, the command data representing character image information;

analyzing for said each character the command data input in said inputting step;

deriving for said each character an adjustment value for adjusting the character color information based on the character size information and character color information as analyzed in said analyzing step;

modifying for said each character the character color information using the adjustment value derived in said deriving step;

storing for said each character the character color information modified in said modifying step; and outputting for said each character the character image information represented by the command data in accordance with the modified character color information stored in said storing step.

2. A method according to claim 1, wherein the image information comprises character data.

3. A method according to claim 1, wherein the image information comprises symbol data.

4. A method according to claim 1, wherein the command data includes the size information is designated respectively for each unit of image data.

5. A method according to claim 1, wherein, in said deriving step, the adjustment value is derived on the basis of both of the color information and the size information.

6. A method according to claim 1, wherein, in said deriving step, the adjustment value is derived on the basis of predetermined table information.

7. An image data processing method comprising the steps of:

inputting individual command data for each character of an image, including character brightness information and character size information, the command data representing character image information;

analyzing for said each character the command data input in said inputting step;

deriving for said each character an adjustment value for adjusting the character brightness information based on the character size information and character brightness information as analyzed in said analyzing step;

modifying for said each character the character brightness information using the adjustment value derived in said deriving step;

storing for said each character the character brightness information modified in said modifying step; and outputting for said each character the character image information represented by the command data in accordance with the modified character brightness information stored in said storing step.

8. A method according to claim 7, wherein the image information comprises character data.

9. A method according to claim 7, wherein the image information comprises symbol data.

10. A method according to claim 7, wherein the size information is designated respectively for each unit of image information.

11. A method claim according to claim 7, wherein, in said deriving step, the adjustment value is derived on the basis of both of the brightness information and the size information.

12. A method claim according to claim 7, wherein, in said deriving step, the adjustment value is derived on the basis of predetermined table information.

13. An image data processing apparatus comprising:

input means for inputting individual command data for each character of an image, including character color information and character size information, the command data representing character image information;

analyzing means for analyzing for said each character the command data input by said input means;

deriving means for deriving for said each character an adjustment value for adjusting the character color information based on the character size information and character color information analyzed by said analyzing means;

modifying means for modifying for said each character the character color information using the adjustment value derived by said deriving means;

memory means for storing for said each character the character color information modified by said modifying means; and output means for outputting for said each character the character image information represented by the command data in accordance with the modified character color information stored in said memory means.

14. An apparatus according to claim 13, wherein said deriving means derives the adjustment value on the basis of both of the color information and the size information.

15. An apparatus according to claim 13, wherein said deriving means derives the adjustment value on the basis of predetermined table information.

16. An apparatus according to claim 13, wherein the image information comprises character data.

17. An apparatus according to claim 13, wherein the image information comprises symbol data.

18. An apparatus according to claim 13, wherein the command data includes the size data respectively for each unit of image data.

19. An image data processing apparatus comprising:

input means for inputting individual command data for each character of an image, including character brightness information and character size information, the command data representing character image information;

analyzing means for analyzing for said each character the command data input by said input means;

deriving means for deriving for said each character an adjustment value for adjusting the character brightness information based on the character size information and character brightness information analyzed by said analyzing means;

modifying means for modifying for said each character the character brightness information using the adjustment value derived by said deriving means;

memory means for storing for said each character the character brightness information modified by said modifying means; and output means for outputting for said each character the character image information represented by the command data in accordance with the modified character brightness information stored in said memory means.

20. An apparatus according to claim 19, wherein the image information comprises character data.

21. An apparatus according to claim 19, wherein the image information comprises symbol data.

22. An apparatus according to claim 19, wherein the command data includes the size information for each unit of image information.

23. An apparatus according to claim 19, wherein said deriving means derives the adjustment value on the basis of both of the brightness information and the size information.

24. An apparatus according to claim 19, wherein said deriving means derives the adjustment value on the basis of predetermined table information.

* * * * *

UNITED STATES PATENT AND TRADEMARK OFFICE
CERTIFICATE OF CORRECTION

PATENT NO. : 5,485,278

DATED : January 16, 1996

INVENTOR(S): Nobuyuki Nakajima

Page 1 of 2

It is certified that error appears in the above-identified patent and that said Letters Patent is hereby corrected as shown below:

Title page:

AT [54]

Title, "BASED" should read --BASED ON--.

AT [56] REFERENCES CITED

U.S. Patent Documents, "Pema et al." should read --Penna et al.--.

COLUMN 1

Line 3, "BASED" should read --BASED ON--.

COLUMN 2

Line 13, "commend" should read --command--.

COLUMN 3

Line 5, "form" should read --from--.
Line 20, "$[R_R, V_G, V_B]$" should read --$[V_R, V_G, V_B]$--.
Line 23, "step 22," should read --step S22,--.
Line 33, "A value of the point number of the character" should be deleted.
Line 34, "character." should be deleted.
Line 37, "data" should read --data of--.

UNITED STATES PATENT AND TRADEMARK OFFICE
CERTIFICATE OF CORRECTION

PATENT NO. : 5,485,278

DATED : January 16, 1996

INVENTOR(S) : Nobuyuki Nakajima

It is certified that error appears in the above-identified patent and that said Letters Patent is hereby corrected as shown below:

COLUMN 4

Line 34, "$[V_B, V_S, V_B]$" should read --$[V_H, V_S, V_B]$--.
Line 63, "to the" should read --to be--.

COLUMN 5

Line 31, "is designated" should read --which is designated--.

Signed and Sealed this

Thirtieth Day of July, 1996

Attest:

BRUCE LEHMAN

Attesting Officer

Commissioner of Patents and Trademarks